(12) United States Patent
Noro et al.

(10) Patent No.: US 10,749,200 B2
(45) Date of Patent: Aug. 18, 2020

(54) NON-HUMIDIFIED PROTON-CONDUCTIVE MEMBRANE, METHOD FOR PRODUCING THE SAME, AND FUEL CELL

(71) Applicant: NATIONAL UNIVERSITY CORPORATION NAGOYA UNIVERSITY, Nagoya-shi, Aichi (JP)

(72) Inventors: Atsushi Noro, Nagoya (JP); Takato Kajita, Nagoya (JP); Takahiro Mori, Nagoya (JP); Yushu Matsushita, Nagoya (JP)

(73) Assignee: NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 64 days.

(21) Appl. No.: 16/095,588

(22) PCT Filed: Mar. 27, 2017

(86) PCT No.: PCT/JP2017/012358
§ 371 (c)(1),
(2) Date: Oct. 22, 2018

(87) PCT Pub. No.: WO2017/183397
PCT Pub. Date: Oct. 26, 2017

(65) Prior Publication Data
US 2019/0109343 A1    Apr. 11, 2019

(30) Foreign Application Priority Data
Apr. 22, 2016  (JP) ................... 2016-085786

(51) Int. Cl.
*H01M 8/1044* (2016.01)
*H01B 1/04* (2006.01)
(Continued)

(52) U.S. Cl.
CPC ....... *H01M 8/1044* (2013.01); *C08F 293/005* (2013.01); *C08J 5/18* (2013.01);
(Continued)

(58) Field of Classification Search
None
See application file for complete search history.

(56) References Cited

U.S. PATENT DOCUMENTS

2002/0127454 A1* 9/2002 Narang ................. C08J 5/2275
429/314
2003/0158273 A1* 8/2003 Kosako ............... H01M 8/1081
521/27

(Continued)

FOREIGN PATENT DOCUMENTS

JP    2002-246041 A    8/2002
JP    2003-535940 A    12/2003

(Continued)

OTHER PUBLICATIONS

Wainright et al. "Acid-Doped Polybenzimidazoles: A New Polymer Electrolyte" J. Electrochem. Soc., Jul. 1995, vol. 142, No. 7, pp. L121-L123.

(Continued)

*Primary Examiner* — Scott J. Chmielecki
(74) *Attorney, Agent, or Firm* — Oliff PLC (57) ABSTRACT

A non-humidified proton-conductive membrane according to the present invention includes a polymer and a proton-conductive substance. The polymer includes a glassy or crystalline first site having a glass-transition temperature or melting temperature higher than the service temperature of the proton-conductive membrane and a second site capable of forming a noncovalent bond. The proton-conductive substance includes a proton-releasing/binding site capable of noncovalently binding to the second site of the polymer (Continued)

and a proton coordination site capable of coordinating to protons, the proton-releasing/binding site and the proton coordination site being included in different molecules that interact with each other or being included in the same molecule. A proton-conductive mixed phase that includes the second site to which the proton-releasing/binding site of the proton-conductive substance is bound and the proton-conductive substance is lower than the service temperature of the proton-conductive membrane. The amount of the proton-releasing/binding site is excessively large compared with the amount of the second site of the polymer.

10 Claims, 5 Drawing Sheets (51) Int. Cl.
| | |
|---|---|
| C08K 5/06 | (2006.01) |
| H01M 8/02 | (2016.01) |
| H01M 8/10 | (2016.01) |
| C08J 5/22 | (2006.01) |
| C08J 5/18 | (2006.01) |
| C08L 101/06 | (2006.01) |
| C08L 101/12 | (2006.01) |
| C08F 293/00 | (2006.01) |
| C08L 27/22 | (2006.01) |
| C08L 33/06 | (2006.01) |
| H01M 8/1048 | (2016.01) |
| H01M 8/1081 | (2016.01) |
| C08F 212/08 | (2006.01) |
| H01M 8/1018 | (2016.01) |

(52) U.S. Cl.
CPC .............. *C08J 5/22* (2013.01); *C08J 5/225* (2013.01); *C08J 5/2231* (2013.01); *C08K 5/06* (2013.01); *C08L 27/22* (2013.01); *C08L 33/066* (2013.01); *C08L 101/06* (2013.01); *C08L 101/12* (2013.01); *H01B 1/04* (2013.01); *H01M 8/02* (2013.01); *H01M 8/10* (2013.01); *H01M 8/1048* (2013.01); *H01M 8/1081* (2013.01); *C08F 212/08* (2013.01); *C08F 2438/00* (2013.01); *C08F 2438/03* (2013.01); *C08J 2327/22* (2013.01); *C08J 2333/14* (2013.01); *C08J 2355/00* (2013.01); *C08J 2453/00* (2013.01); *C08J 2455/00* (2013.01); *H01M 2008/1095* (2013.01); *H01M 2300/0082* (2013.01); *H01M 2300/0091* (2013.01); *Y02P 70/56* (2015.11)

(56) References Cited

U.S. PATENT DOCUMENTS

| | | | | |
|---|---|---|---|---|
| 2003/0219640 | A1* | 11/2003 | Nam | H01M 8/1039 |
| | | | | 429/494 |
| 2006/0141317 | A1* | 6/2006 | Sun | H01M 8/1048 |
| | | | | 429/482 |
| 2014/0023952 | A1* | 1/2014 | Yim | H01M 8/1072 |
| | | | | 429/482 |

FOREIGN PATENT DOCUMENTS

| | | |
|---|---|---|
| JP | 2004-335231 A | 11/2004 |
| JP | 2006-59552 A | 3/2006 |
| JP | 2006-508493 A | 3/2006 |
| JP | 2007-200794 A | 8/2007 |
| WO | 1996/13872 A1 | 5/1996 |

OTHER PUBLICATIONS

Jun. 20, 2017 International Seach Report issued in International Patent Application No. PCT/JP2017/012358.

\* cited by examiner

NON-HUMIDIFIED PROTON-CONDUCTIVE MEMBRANE, METHOD FOR PRODUCING THE SAME, AND FUEL CELL

TECHNICAL FIELD

The present invention relates to a non-humidified proton-conductive membrane, a method for producing the proton-conductive membrane, and a fuel cell.

BACKGROUND ART

A fuel cell is composed primarily of a solid electrolyte membrane that conducts protons and a pair of electrodes including a catalyst between which the solid electrolyte membrane is interposed. Perfluorosulfonic acid membranes, such as Nafion (registered trademark, the same applies hereinafter), have been conventionally used as a solid electrolyte membrane. However, it is necessary to humidify a perfluorosulfonic acid membrane for increasing the proton conductivity of the perfluorosulfonic acid membrane. Accordingly, a humidifying system needs to be used when electric power is generated using such a fuel cell. Installation of the humidifying system disadvantageously increases the size of the entire fuel cell apparatus, the amount of time and effort required, and the maintenance costs. Under these circumstances, power generation in a non-humidified system has been studied. A polybenzimidazole/phosphoric acid mixed system has been developed as a non-humidified proton-conductive membrane (e.g., see PTL 1 and NPL 1). In this system, imidazole units and phosphate ions serve as temporal proton carriers.

CITATION LIST

Patent Literature

PTL 1: International Publication No. 1996/13872

Non Patent Literature

NPL 1: J. Electrochem. Soc., Vol. 142, No. 7, 1995, pp. 121-123

SUMMARY OF INVENTION

Technical Problem

However, in the case where the polybenzimidazole/phosphoric acid mixed system is used, molecules of phosphoric acid may elute during power generation and, consequently, proton conductivity may be reduced after a long period of use. Accordingly, the development of a non-humidified proton-conductive membrane other than the polybenzimidazole/phosphoric acid mixed system has been anticipated.

The present invention was made to address the above issues. A primary object of the present invention is to provide a novel non-humidified proton-conductive membrane.

Solution to Problem

A non-humidified proton-conductive membrane according to the present invention is a proton-conductive membrane having proton conductivity under a non-humidified condition, the proton-conductive membrane including:

a polymer including a glassy or crystalline first site having a glass-transition temperature or melting temperature higher than a service temperature of the proton-conductive membrane, and a second site including a functional group capable of forming a noncovalent bond; and a proton-conductive substance including a proton-releasing/binding site (i.e., a third site) capable of releasing protons and a proton coordination site (i.e., a fourth site) capable of coordinating to the protons, the proton-releasing/binding site including a functional group capable of noncovalently binding to the second site of the polymer, the proton-releasing/binding site and the proton coordination site being included in different molecules that interact with each other or being included in the same molecule, a proton-conductive mixed phase having a glass-transition temperature lower than the service temperature of the proton-conductive membrane, the proton-conductive mixed phase including the second site to which the proton-releasing/binding site of the proton-conductive substance is bound and the proton-conductive substance, the amount of the proton-releasing/binding site being excessively large compared with the amount of the second site of the polymer.

In the non-humidified proton-conductive membrane according to the present invention, the glass-transition temperature or melting temperature of the first site is higher than the service temperature of the proton-conductive membrane, and the glass-transition temperature of the proton-conductive mixed phase that includes the second site to which the proton-releasing/binding site of the proton-conductive substance is bound and the proton-conductive substance is lower than the service temperature of the proton-conductive membrane. Consequently, during the use of the non-humidified proton-conductive membrane according to the present invention, the first site is in a solid state, while the proton-conductive mixed phase that includes the second site and the proton-conductive substance is in a molten state (i.e., in rubber form) and, as a whole, the proton-conductive membrane forms a proton-conductive soft elastomer membrane that does not become fluidized and retains its original shape. Furthermore, since the amount of the proton-releasing/binding site is excessively large compared with the amount of the second site of the polymer, free protons are likely to be generated from the proton-releasing/binding site. This greatly contributes to the conduction of protons. Moreover, in the non-humidified proton-conductive membrane according to the present invention, the proton coordination site of the proton-conductive substance serves as a temporal proton carrier and has high molecular mobility. This enables the proton-conductive membrane to exhibit good proton conductivity even under a non-humidified condition.

DESCRIPTION OF EMBODIMENTS

A preferred embodiment of the present invention is described below.

Figure 1:
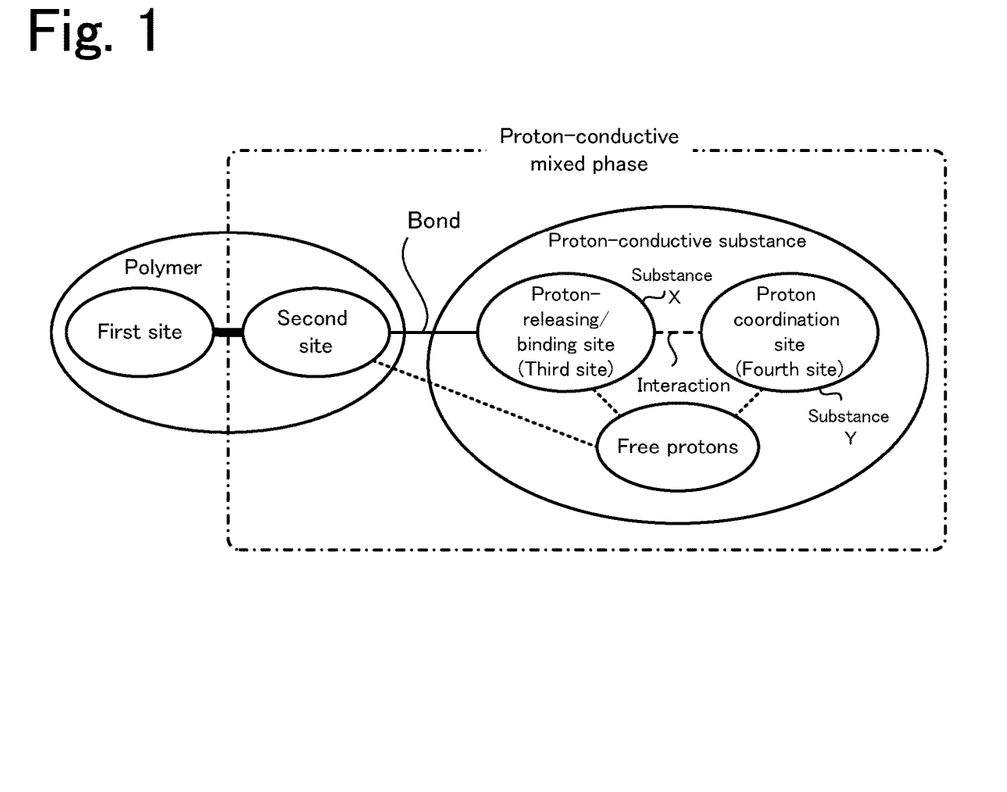
FIG. 1 is a schematic diagram illustrating a non-humidified proton-conductive membrane.
Figure 2:
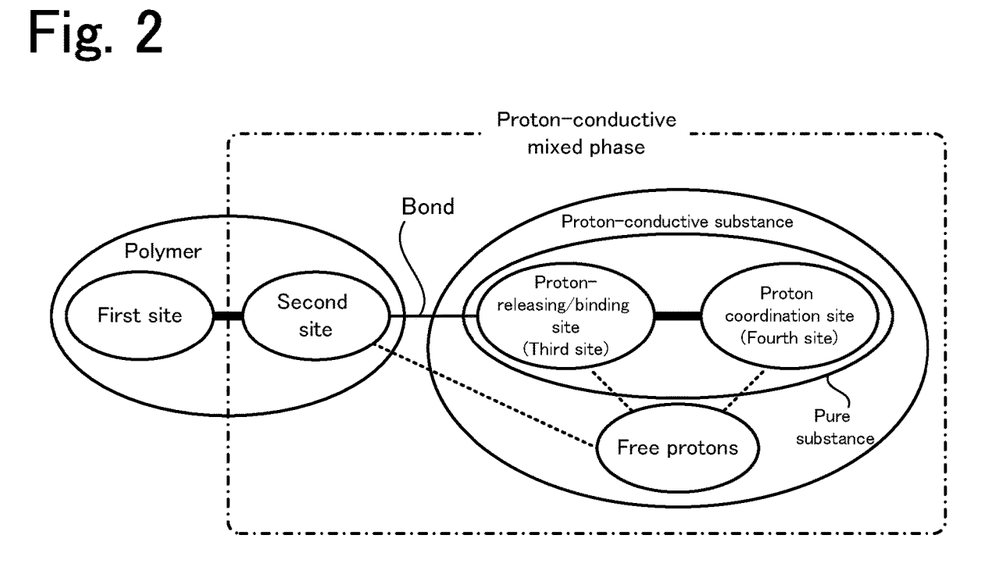
FIG. 2 is a schematic diagram illustrating a non-humidified proton-conductive membrane.

A non-humidified proton-conductive membrane according to the embodiment includes a polymer and a proton-conductive substance as illustrated in FIG. 1 or 2. The polymer includes a glassy or crystalline first site having a glass-transition temperature or melting temperature higher than the service temperature of the proton-conductive membrane and a second site including a functional group capable of forming a noncovalent bond. The proton-conductive substance includes a proton-releasing/binding site (i.e., a third site) capable of released protons and noncovalently binding to the second site of the polymer and a proton coordination site (i.e., a fourth site) capable of coordinating to the protons. The proton-releasing/binding site and the proton coordination site are included in different molecules that interact with each other or are included in the same molecule. A proton-conductive mixed phase that includes the second site to which the proton-releasing/binding site of the proton-conductive substance is bound and the proton-conductive substance has a glass-transition temperature lower than the service temperature of the non-humidified proton-conductive membrane. The amount of the proton-releasing/binding site is excessively large compared with the amount of the second site of the polymer.

Since the glass-transition temperature or melting temperature of the first site of the polymer is higher than the service temperature (e.g., 80° C. or 95° C.) of the non-humidified proton-conductive membrane, the first site is glassy or crystalline at the service temperature of the non-humidified proton-conductive membrane. Examples of the first site include, but are not limited to, oligostyrenes, oligoacrylic acid esters, oligomethacrylic acid esters, oligo-olefins, oligosulfones, oligoarylates, oligoether ketones, oligoetherimides, oligophenylene sulfides, oligophenylene ethers, oligocarbonates, oligobenzimidazoles, and oligofluoroethylenes. Examples of the oligostyrenes include oligostyrene, oligoacetylstyrene, oligoanisoylstyrene, oligobenzoylstyrene, oligobiphenylstyrene, oligobromoethoxystyrene, oligobromomethoxystyrene, oligobromostyrene, oligobutoxymethylstyrene, oligo-tert-butylstyrene, oligobutyrylstyrene, oligochlorofluorostyrene, oligochloromethylstyrene, oligochlorostyrene, oligocyanostyrene, oligodichlorostyrene, oligodifluorostyrene, oligodimethylstyrene, oligoethoxymethyistyrene, oligoethoxystyrene, oligofluoromethylstyrene, oligofluorostyrene, oligoiodostyrene, oligomethoxycarbonylstyrene, oligomethoxymethylstyrene, oligomethylstyrene, oligomethoxystyrene, oligoperfluorostyrene, oligophenoxystyrene, oligophenylacetylstyrene, oligophenylstyrene, oligopropoxystyrene, oligotoluoylstyrene, and oligotrimethylstyrene. Examples of the oligoacrylic acid esters include oligoadamantyl acrylate, oligo-tert-butyl acrylate, oligo-tert-butylphenyl acrylate, oligocyanoheptyl acrylate, oligocyanohexyl acrylate, oligocyanomethyl acrylate, oligocyanophenyl acrylate, oligofluoromethyl acrylate, oligomethoxycarbonylphenyl acrylate, oligomethoxyphenyl acrylate, oligonaphthyl acrylate, oligopentachlorophenyl acrylate, and oligophenyl acrylate. Examples of the oligomethacrylic acid esters include oligomethyl methacrylate, oligoethyl methacrylate, oligomethacrylonitrile, oligoadamantyl methacrylate, oligobenzyl methacrylate, oligo-tert-butyl methacrylate, oligo-tert-butylphenyl methacrylate, oligocycloethyl methacrylate, oligocyanoethyl methacrylate, oligocyanomethylphenyl methacrylate, oligocyanophenyl methacrylate, oligocyclobutyl methacrylate, oligocyclodecyl methacrylate, oligocyclododecyl methacrylate, oligocyclobutyl methacrylate, oligocyclohexyl methacrylate, oligocyclooctyl methacrylate, oligofluoroalkyl methacrylate, oligoglycidyl methacrylate, oligoisobornyl methacrylate, oligoisobutyl methacrylate, oligophenyl methacrylate, oligotrimethylsilyl methacrylate, and oligoxylenyl methacrylate. Examples of the oligo-olefins include oligoethylene, oligopropylene, and oligo-α-olefin. Examples of the oligosulfones include oligophenyl sulfone, oligoether sulfone, and oligosulfone. Examples of the oligoarylates include oligoarylate. Examples of the oligoether ketones include oligoether ketone, oligoether ether ketone, oligoether ketone ketone, and oligoether ether ketone ketone. Examples of the oligoetherimides include oligoetherimide. Examples of the oligophenylene sulfides include oligophenylene sulfide. Examples of the oligophenylene ethers include oligophenylene ether. Examples of the oligocarbonates include oligocarbonate. Examples of the oligobenzimidazoles include oligobenzimidazole. Examples of the oligofluoroethylenes include oligotetrafluoroethylene, oligochlorotrifluoroethylene, and oligovinylidene fluoride. The prefix "oligo-" means an oligomer consisting of a few to dozen monomers. Multimers consisting of a larger number of monomers than oligomers, that is, polymers, may also be used as the first site.

The second site of the polymer includes a functional group capable of forming a noncovalent bond. Examples of the noncovalent bond include a hydrogen bond, a coordinate bond, and an ionic bond (the same applies hereinafter). The second site may include a plurality of functional groups capable of forming a noncovalent bond or may be a polymer consisting of units including a functional group capable of forming a noncovalent bond. The functional group capable of forming a noncovalent bond is preferably a basic group and is more preferably a nitrogen-containing heterocyclic group. Examples of the nitrogen-containing heterocyclic group include a pyridyl group, a benzimidazolyl group, a pyrimidyl group, an imidazolyl group, a benzothiazolyl group, a benzoxazolyl group, an oxadiazolyl group, a quinolyl group, a quinoxalyl group, and a thiadiazolyl group. For example, in the case where the second site includes a pyridyl group, polyvinylpyridines (functional group: pyridyl group) and the like may be used. Examples of the polyvinylpyridines include poly(2-vinylpyridine), poly(3-vinylpyridine), and poly(4-vinylpyridine).

The polymer may be any type of polymer that includes at least the first site and the second site; for example, the polymer may be a block copolymer that includes the first site and the second site or may be a random copolymer or multi-block copolymer that includes the first site and the second site. Hereinafter, the first site is referred to as "A-chain" and the second site is referred to as "B-chain" for the sake of simplicity. In the case where the polymer is an A-B diblock copolymer, the average degree of polymerization of the A-chain is preferably 2 to 10000. If the average degree of polymerization of the A-chain is less than the lower limit, it becomes difficult to form a glassy or crystalline domain. If the average degree of polymerization of the A-chain exceeds the upper limit, it becomes difficult to handle the sample. The average degree of polymerization of the A-chain is more preferably 10 to 5000 and is particularly preferably 30 to 2000. The average degree of polymerization of the B-chain is preferably 2 to 5000. If the average degree of polymerization of the B-chain is less than the lower limit, it becomes difficult to uniformly form the proton-conductive mixed phase by mixing the polymer with the proton-conductive substance. If the average degree of polymerization of the B-chain exceeds the upper limit, the acidity of the proton-conductive mixed phase is reduced disadvantageously. The average degree of polymerization of the B-chain is more preferably 10 to 1000 and is particularly preferably 50 to 500. In the case where the polymer is an A-B diblock copolymer, the compositional ratio of the A-chain to the B-chain is preferably 99:1 to 10:90. If the compositional ratio does not fall within the above range, the entirety of the proton-conductive membrane may disadvantageously become grassy or, in another case, the proton-conductive membrane may fail to form a soft elastomer and become fluidized disadvantageously.

The proton-conductive substance includes a proton-releasing/binding site (i.e., a third site) that is capable of released protons and includes a functional group capable of noncovalently binding to the second site of the polymer and a proton coordination site (i.e., a fourth site) capable of coordinating to the protons. The proton-releasing/binding site and the proton coordination site are included in different molecules that interact with each other (see FIG. 1) or being included in the same molecule (see FIG. 2). The functional group of the proton-releasing/binding site is preferably an acidic group in the case where the functional group included in the second site of the polymer is a basic group. Examples of the acidic group include a carboxyl group, a phosphate group, a sulfo group, and a sulfonylimide group. Among these, a sulfo group and a sulfonylimide group are preferable. The amount of the proton-releasing/binding site is excessively large compared with the amount of the second site of the polymer. This increases the likelihood of free protons generating from the proton-releasing/binding site and, consequently, markedly contributes to the conduction of protons. The proton coordination site preferably includes a functional group that includes a lone pair and is capable of weakly coordinating to protons. Examples of such a functional group include an ether linkage, an ester group, an alcohol group, a ketone group, and an amide group. Among these, an ether linkage and an alcohol group are preferable.

The proton-conductive substance may be a mixture that includes a substance X including the proton-releasing/binding site and a nonaqueous substance Y including the proton coordination site and interacting with the substance X (see FIG. 1). Since the substance X is noncovalently bound to the second site of the polymer and the substance Y interacts with the substance X, both substances X and Y do not elute from the membrane. The substance X is not limited. In the case where the functional group included in the second site of the polymer is a basic group, the substance X preferably includes an acidic group as a functional group. Examples of the acidic group include a carboxyl group, a phosphate group, a sulfo group, and a sulfonylimide group. Among these, a sulfo group and a sulfonylimide group are preferable. The substance X is particularly preferably selected from, for example, a polymer having a side chain including a sulfo group and a fluorine compound including a sulfonylimide group. The polymer having a side chain including a sulfo group is preferably a perfluorocarbon polymer having a side chain including a perfluoroalkyl portion including a sulfo group (e.g., Nafion). The fluorine compound including a sulfonylimide group is particularly preferably bis(trifluoromethanesulfonyl)imide. The substance Y may be any nonaqueous substance (i.e., any substance other than water) that includes the proton coordination site and interacts with the substance X. The substance Y is preferably selected from, for example, a solvent including an ether linkage and a polymer including an alcohol group. The solvent including an ether linkage is preferably a protic solvent including an ether linkage. Examples of such a protic solvent include hydroxy-terminated polyethylene glycol, tetraethylene glycol, and triethylene glycol. Specifically, the protic solvent may be a protic solvent in which hydrogen atoms are replaced with fluorine atoms, such as Fomblin D2 (registered trademark) produced by SOLVAY, that is, dihydroxy-terminated perfluoropolyether, or Fluorolink C10 (registered trademark) produced by SOLVAY, that is, carboxyl-terminated perfluoropolyether. The polymer including an alcohol group is preferably an acrylic acid polymer including an alcohol group. The acrylic acid polymer may be a polymer consisting of one type of monomer or a copolymer consisting of two or more types of monomers. Examples of the monomer include (2-hydroxyethyl) acrylate and (4-hydroxybutyl) acrylate. In the case where two or more types of monomers are used, it is preferable that at least one of the monomers be a monomer including two or more polymerizable functional groups. When the monomer including two or more polymerizable functional groups is used, a branched acrylic acid copolymer including an alcohol group can be produced. This reduces the flowability of the proton-conductive mixed phase and enhances a shape retention property. Examples of the monomer including two or more polymerizable functional groups include N,N'-methylenebisacrylamide and divinylbenzene.

The proton-conductive substance may be a single pure substance including the proton-releasing/binding site and the proton coordination site in the same molecule (see FIG. 2). Since the proton-releasing/binding site noncovalently binds to the second site of the polymer, the above substance does not readily elute from the membrane. The above proton-conductive substance is not limited and is preferably, for example, a disulfonic acid including an ether linkage. Examples of such a disulfonic acid include 3,3'-(propane-1,3-diylbis(oxy))bis(propane-1-sulfonic acid).

The proton-conductive substance and the polymer are selected such that the glass-transition temperature of the proton-conductive mixed phase, which includes the second site to which the proton-releasing/binding site of the proton-conductive substance is bound and the proton-conductive substance, is lower than the service temperature of the non-humidified proton-conductive membrane. This enables the proton-conductive mixed phase to melt and conduct protons in a suitable manner during the use. Furthermore, the membrane exhibits the properties of a soft elastomer as a whole. The service temperature of the non-humidified proton-conductive membrane may be set to be, for example, 50° C., 100° C., or a temperature higher than 150° C., in the case where the glass-transition temperature or melting temperature of the first site of the polymer is sufficiently high.

A method for producing the non-humidified proton-conductive membrane according to the embodiment is described below. In the case where the proton-conductive substance is a mixture that includes a substance X including the proton-releasing/binding site and a nonaqueous substance Y including the proton coordination site and interacting with the substance X, the non-humidified proton-conductive membrane is produced in the following manner. Specifically, the polymer is dissolved or dispersed in a solvent to prepare a solution or dispersion of the polymer. This solvent is preferably a solvent that relatively readily evaporates, such as an alcohol solvent, an ether solvent, an ester solvent, a pyridine solvent, water, or a mixed solvent including any combination of the above solvents. The substance X and the substance Y are dissolved or dispersed in a solvent to prepare a solution or dispersion of the proton-conductive substance. This solvent is preferably a solvent that relatively readily evaporates, such as an alcohol solvent, an ether solvent, an ester solvent, a pyridine solvent, water, or a mixed solvent including any combination of the above solvents. The solution or dispersion of the polymer is mixed with the solution or dispersion of the proton-conductive substance. Subsequently, the solvents are evaporated. Hereby, a non-humidified proton-conductive membrane is formed. In the case where the substance Y is the acrylic acid polymer including an alcohol group, it is preferable to mix the polymer that includes the first site and the second site with the substance X and a monomer that is a raw material for the acrylic acid polymer including an alcohol group, which constitutes the substance Y, and polymerize the resulting mixture in order to prevent the molten state of the proton-conductive mixed phase from being degraded. In the case where the acrylic acid polymer is a copolymer, it is preferable to adequately adjust the amount of the monomer including two or more polymerizable functional groups, which is capable of forming a branched copolymer.

In the case where the proton-conductive substance is a single pure substance that includes the proton-releasing/binding site and the proton coordination site in the same molecule, the non-humidified proton-conductive membrane is produced in the following manner. Specifically, the polymer is dissolved or dispersed in a solvent to prepare a solution or dispersion of the polymer. This solvent is preferably a solvent that relatively readily evaporates, such as an alcohol solvent, an ether solvent, an ester solvent, a pyridine solvent, water, or a mixed solvent including any combination of the above solvents. The single pure substance that includes the proton-releasing/binding site and the proton coordination site in the same molecule is dissolved or dispersed in a solvent to prepare a solution or dispersion of the proton-conductive substance. This solvent is preferably a solvent that relatively readily evaporates, such as an alcohol solvent, an ether solvent, an ester solvent, a pyridine solvent, water, or a mixed solvent including any combination of the above solvents. The solution or dispersion of the proton-conductive substance may include an alcohol such as 1,3-propanediol, triethylene glycol, tetraethylene glycol, or dihydroxy-terminated polyethylene glycol. The solution or dispersion of the polymer is mixed with the solution or dispersion of the proton-conductive substance. Subsequently, the solvents are evaporated. Hereby, a non-humidified proton-conductive membrane is formed.

Figure 3:
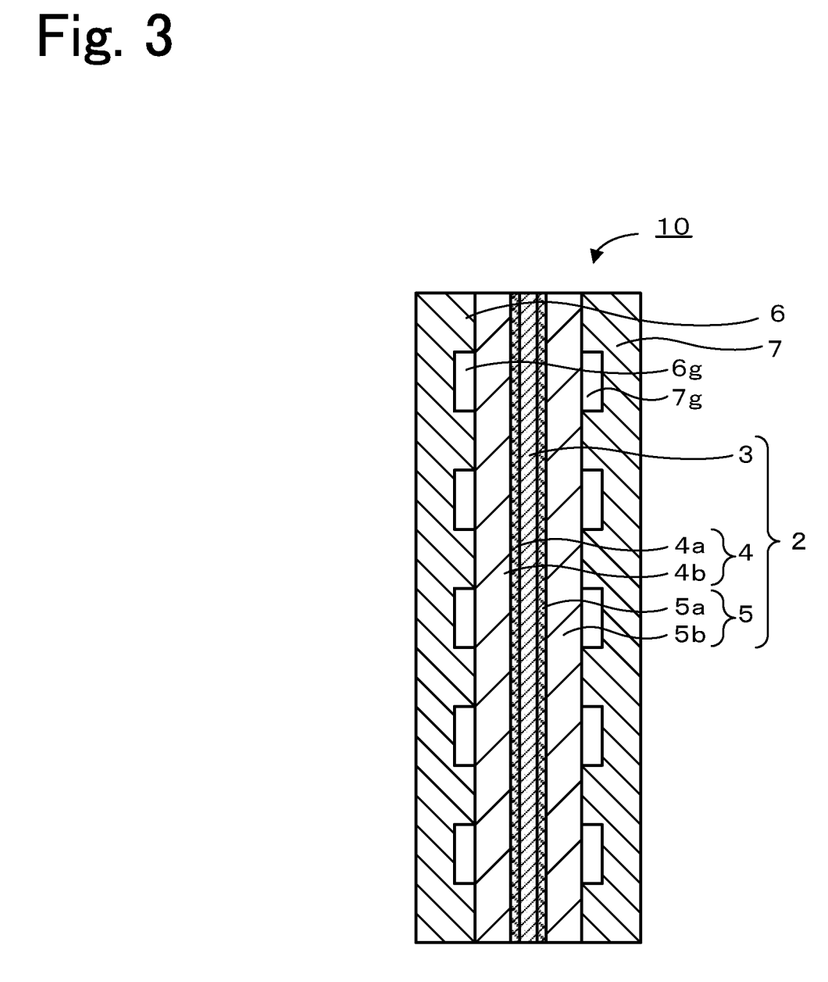
FIG. 3 is a cross-sectional view of a fuel cell 10.

A fuel cell that includes the non-humidified proton-conductive membrane according to the embodiment is described below with reference to FIG. 3. FIG. 3 is a cross-sectional view of a fuel cell 10. The fuel cell 10 includes a membrane electrode assembly (hereinafter, referred to as "MEA") 2 constituted by the above-described non-humidified proton-conductive membrane 3 and electrodes 4 and 5 disposed on the respective surfaces of the proton-conductive membrane 3 and a pair of separators 6 and 7 between which the MEA 2 is interposed. The MEA 2 is constituted by the non-humidified proton-conductive membrane 3 and the two electrodes, that is, an anode 4 that serves as a fuel electrode and a cathode 5 that serves as an oxygen electrode, between which the proton-conductive membrane 3 is interposed. The anode 4 is constituted by a catalyst layer 4a and a gas diffusion layer 4b. The cathode 5 is constituted by a catalyst layer 5a and a gas diffusion layer 5b. The catalyst layers 4a and 5a are located on the sides of the respective electrodes on which the electrodes are in contact with the non-humidified proton-conductive membrane 3 and composed of conductive carbon black including platinum fine particles. The gas diffusion layers 4b and 5b are disposed on the catalyst layers 4a and 5a, respectively, and composed of carbon cloth made of carbon fiber yarn.

The platinum particles included in the catalyst layers 4a and 5a facilitate the separation of hydrogen into protons and electrons and a reaction in which oxygen combines with protons and electrons to produce water; any substance other than platinum which has the same function as platinum may be used. The gas diffusion layers 4b and 5b may be composed of, instead of carbon cloth, carbon paper or carbon felt made of carbon fibers and are only required to have sufficiently high gas diffusibility and sufficiently high electrical conductivity. The pair of separators 6 and 7 are composed of a gas-impermeable electrically conductive member (e.g., carbon or a metal). The separator 6 has a fuel-gas channel 6g which is formed in the surface that is in contact with the anode 4 of the MEA 2 and through which a fuel gas is passed. The separator 7 has an oxidation-gas channel 7g which is formed in the surface that is in contact with the cathode 5 of the MEA 2 and through which an oxidation gas is passed.

The power generation using the fuel cell 10 is described. For generating electric power using the fuel cell 10, hydrogen that serves as a fuel gas is fed from the outside of the fuel cell 10 into the fuel-gas channel 6g, while air that serves as an oxidation gas is fed into the oxidation-gas channel 7g. Hydrogen passed though the fuel-gas channel 6g is diffused in the gas diffusion layer 4b of the anode 4 and reaches the catalyst layer 4a, in which hydrogen is separated into protons and electrons. The protons migrate to the cathode 5 through the non-humidified proton-conductive membrane 3. The electrons migrate to the cathode through an external circuit that is not illustrated in the drawings. The air passed through the oxidation-gas channel 7g is diffused in the gas diffusion layer 5b of the cathode 5 and reaches the catalyst layer 5a. Subsequently, in the cathode 5, the protons and electrons react with oxygen included in the air to produce water. The above reaction produces an electromotive force. As described above, it is not necessary to humidify the non-humidified proton-conductive membrane 3 included in the fuel cell 10 with a humidifier since the non-humidified proton-conductive membrane 3 exhibits proton conductivity even under a non-humidified condition.

The present invention is not limited the examples described above. It will be appreciated that the present invention can be implemented in various forms so long as they fall within the technical scope of the invention.

EXAMPLES

Examples of the present invention are described below. The proton-conductive soft elastomer membranes prepared in Examples correspond to the non-humidified proton-conductive membrane according to the present invention. Table 1 summarizes the results obtained in Examples and Comparative examples. Note that, Examples below do not limit the present invention.

Example 1

[1] Preparation of Proton-Conducting Soft Elastomer Membrane

A polystyrene-b-poly(4-vinylpyridine) block copolymer (hereinafter, referred to as "S4VP") synthesized by living anionic polymerization was purchased from Polymer Source, Inc. The average degree of polymerization of polystyrene was 2115. The average degree of polymerization of poly(4-vinylpyridine) was 143. In 2.0 g of a tetrahydrofuran (THF)/methanol (MeOH) mixed solvent with a weight ratio of 7/3, 51 mg of S4VP was dissolved. Into a Teflon beaker ("Teflon" is a registered trademark) having a volume of 10 mL, 2.30 g of a 10-wt % aqueous dispersion of Nafion (equivalent mass: 1000) purchased from Aldrich was charged. The beaker was placed on a hot plate heated at 70° C. for 48 hours to evaporate water. Subsequently, 240 mg of tetraethylene glycol (TEG) was added to the beaker. To the beaker, 2.0 g of a THF/MeOH mixed solvent with a weight ratio of 6/4 was further added in order to dissolve Nafion in TEG/THF/MeOH. The S4VP/THF/MeOH solution was mixed with the Nafion/TEG/THF/MeOH solution. No precipitate was formed in the resulting liquid mixture. The liquid mixture was placed on a hot plate heated at 60° C. for 2 days in order to evaporate THF/MeOH and perform casting. Hereby, a proton-conductive soft elastomer membrane with a Nafion/TEG/S4VP ratio of about 4.5/4.5/1 by weight was prepared. The amount of sulfo groups included in Nafion was theoretically about 7.4 times the amount of pyridyl groups included in S4VP.

Figure 4:
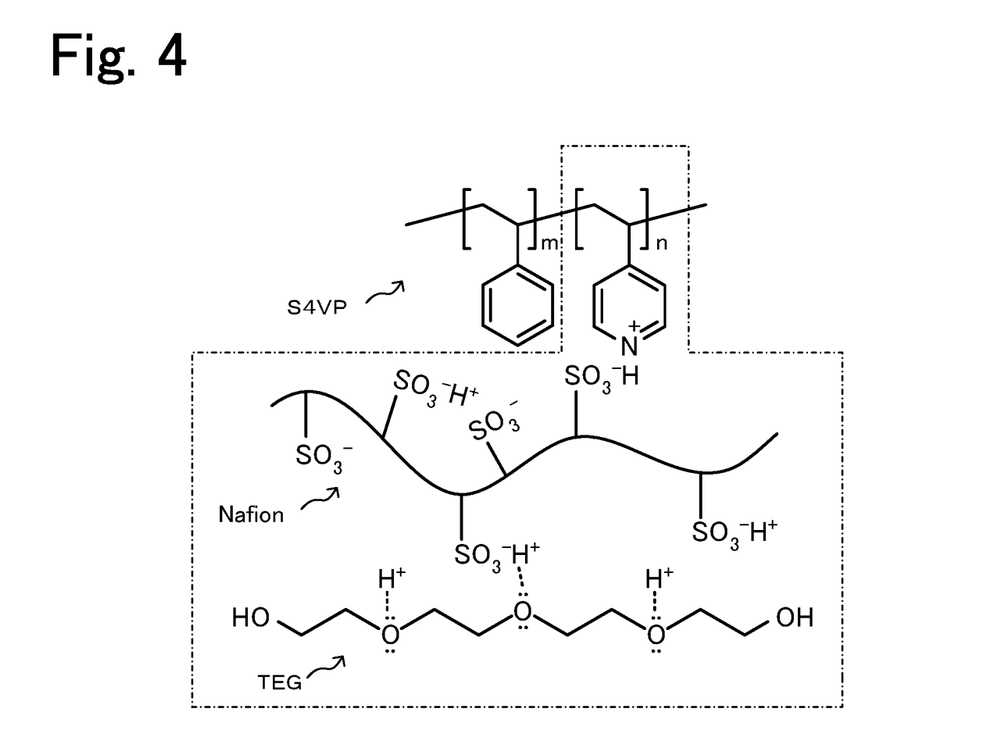
FIG. 4 is a schematic diagram illustrating a proton-conductive soft elastomer membrane prepared in Example 1.

FIG. 4 is a schematic diagram illustrating the proton-conductive soft elastomer membrane. In FIG. 4, the polystyrene portion corresponds to the first site of the polymer; the poly(4-vinylpyridine) portion corresponds to the second site of the polymer; Nafion corresponds to the substance x including the proton-releasing/binding site; and TEG corresponds to the substance Y including the proton coordination site. The Tg (glass-transition temperature) of polystyrene was about 100° C. The Tg of poly(4-vinylpyridine) was about 150° C. The Tg of Nafion was about 130° C. The melting point of TEG was about −6° C. The pyridyl groups included in poly(4-vinylpyridine) are ionically bound to some of the sulfo groups included in Nafion. Some of the sulfo groups included in Nafion are weakly bound to oxygen atoms included in ether linkages of TEG by electrostatic interaction. Some of the sulfo groups release protons to form sulfonate ions. In Example 1, the proton-conductive mixed phase (the portion surrounded by the one-dot chain line in FIG. 4) is a mixture including Nafion, TEG, and poly(4-vinylpyridine) and fixed to polystyrene. The proton-conductive mixed phase had a Tg equal to or lower than room temperature and was therefore in a molten state at the temperature (80° C. or 95° C., see [2] below) at which alternating current impedance was measured. This measurement temperature is considered as a service temperature of the proton-conductive soft elastomer membrane.

[2] Measurement of Alternating Current Impedance

Platinum nets having a thickness of about 0.1 mm were used as electrodes. The distance between the electrodes was set to 0.50 cm. The proton-conductive soft elastomer membrane was interposed between the electrodes. The membrane had a thickness of 0.04 cm and a width of 0.32 cm. The sample to be measured, which was interposed between the electrodes, was placed in a natural convection thermostatic drying oven. The sample was dried for about 6 hours with the temperature of the drying oven being set to 60° C. Subsequently, the temperature (i.e., the measurement temperature) of the drying oven was increased to 80° C. After the internal temperature of the drying oven had been stabilized, the alternating current impedance of the sample was measured under a non-humidified condition at a voltage of 80 mV while the frequency was changed from 1000000 Hz to 1 Hz. The measurement was conducted using a potentio/galvanostat VERSASTAT 4-400 with FRA (Prinston Applied Research). The resistance of the sample determined from the x-intercept of the Cole-Cole plot was $5.0 \times 10^4 \Omega$. The proton conductivity of the sample calculated using the relationship formula: Proton conductivity=Interelectrode distance/(Membrane thickness×Membrane width×Resistance) was $7.8 \times 10^{-4}$ S/cm. After the temperature at which alternating current impedance was measured had been increased to 95° C., the sample had a resistance of $3.1 \times 10^4$ S/cm and a proton conductivity of $1.3 \times 10^{-3}$ S/cm. The proton conductivity of the sample was increased when the temperature was increased from 80° C. to 95° C. This is presumably because, when the temperature was increased, the viscosity of the proton-conductive mixed phase that was in a molten state was reduced and, accordingly, the proton conductivity of the sample was increased. During the measurement, the proton-conductive soft elastomer membrane did not become fluidized and retained its original shape as a whole.

TABLE 1

| | Proton-conducting substance | Polymer | Mass ratio | Measurement temperature [° C.] | Resistance [Ω] | Proton conductivity [S/cm] |
|---|---|---|---|---|---|---|
| Example 1 | Nafion + TEG | S4VP | 4.5/4.5/1 [X1] | 80 | $5.0 \times 10^4$ | $7.8 \times 10^{-4}$ |
| | | | | 95 | $3.1 \times 10^4$ | $1.3 \times 10^{-3}$ |
| Comparative Example 1 | Nafion + TEG | — | 5.1/4.9/0 [X1] | | [X3] | |
| Comparative Example 2 | Nafion | S4VP | 6.7/0/3.3 [X1] | 80 | | [X4] |
| Example 2 | Nafion + TEG | S4VP | 4/4/2 [X1] | 80 | $1.2 \times 10^5$ | $2.3 \times 10^{-4}$ |
| | | | | 95 | $8.3 \times 10^4$ | $3.3 \times 10^{-4}$ |
| Example 3 | Nafion + TEG | S4VP | 6/3/1 [X1] | 80 | $8.3 \times 10^4$ | $6.9 \times 10^{-4}$ |
| | | | | 95 | $5.6 \times 10^4$ | $1.0 \times 10^{-3}$ |
| Example 4 | BSA(+PD) | S2VP | 4/4/2 [X2] | 80 | $4.1 \times 10^4$ | $1.5 \times 10^{-3}$ |
| | | | | 95 | $2.1 \times 10^4$ | $2.8 \times 10^{-3}$ |
| | | | | 65 | $6.1 \times 10^4$ | $9.8 \times 10^{-4}$ |
| | | | | 47 | $1.4 \times 10^5$ | $4.3 \times 10^{-4}$ |
| Example 5 | HTFSI + TEG + Alcohol group-containing acrylic acid copolymer | S2VP | 4.06/2.94/2/1 [X5] | 80 | $7.0 \times 10^4$ | $3.7 \times 10^{-4}$ |
| | | | | 95 | $6.6 \times 10^4$ | $3.9 \times 10^{-4}$ |

[X1] Mass ratio of Nafion/TEG/S4VP.
[X2] Mass ratio of BSA/PD/S2VP.
[X3] It could not be measured because it did become fluidized.
[X4] Resistance was extremely large, and the proton conductivity was extremely low.
[X5] Mass ratio of HTFSI/TEG/Alcohol group-containing acrylic acid copolymer/S2VP.

Comparative Example 1

Into a Teflon beaker having a volume of 10 mL, 2.52 g of a 10-wt % aqueous dispersion of Nafion (equivalent mass: 1000) was charged. The beaker was placed on a hot plate heated at 70° C. for 48 hours to evaporate water. Subsequently, 240 mg of TEG was added to the beaker. To the beaker, 2.0 g of a THF/MeOH mixed solvent with a weight ratio of 6/4 was further added in order to dissolve Nafion in TEG/THF/MeOH. The resulting solution was placed on a hot plate heated at 60° C. for 2 days in order to evaporate THF/MeOH and perform casting. Hereby, a clayey mixture consisting of Nafion and TEG which was uniform at room temperature was prepared. When the clayey mixture was placed in a natural convection thermostatic drying oven heated at 50° C. in order to measure the alternating current impedance of the clayey mixture under a non-humidified condition, the clayey mixture became fluidized. Therefore, it was not possible to determine the proton conductivity of the clayey mixture in a solid state. It is considered that, in Comparative example 1 where the proton-conductive mixed phase was a mixture of Nafion with TEG, fluidization occurred at 50° C. because of absence of a solid phase that supports the proton-conductive mixed phase.

Comparative Example 2

In 2.0 g of a THF/MeOH mixed solvent with a weight ratio of 7/3, 75 mg of S4VP purchased from Polymer Source, Inc. in which the average degree of polymerization of polystyrene was 2115 and the average degree of polymerization of poly(4-vinylpyridine) was 143 was dissolved. Into a Teflon beaker having a volume of 10 mL, 1.53 g of a 10-wt % aqueous dispersion of Nafion (equivalent mass: 1000) was charged. The beaker was placed on a hot plate heated at 70° C. for 48 hours to evaporate water. Subsequently, 2.0 g of a THF/MeOH mixed solvent with a weight ratio of 6/4 was added to the beaker in order to dissolve Nafion in THF/MeOH. The S4VP/THF/MeOH solution was mixed with the Nafion/THF/MeOH solution. No precipitate was formed in the resulting liquid mixture. The liquid mixture was placed on a hot plate heated at 60° C. for 2 days in order to evaporate THF/MeOH and perform casting. Hereby, a solid membrane was prepared. For measuring the alternating current impedance of the membrane, a membrane having a thickness of 0.04 cm and a width of 0.32 cm was prepared. The membrane was interposed between electrodes such that the distance between the electrodes was 0.50 cm and then placed in a natural convection thermostatic drying oven. The temperature of the drying oven was set to 80° C. After the internal temperature of the drying oven had been stabilized, the alternating current impedance of the membrane was measured under a non-humidified condition at a voltage of 80 mV while the frequency was changed from 1000000 Hz to 1 Hz. It was confirmed that the membrane had a considerably high resistance and a considerably low proton conductivity. In Comparative example 2, the component that corresponds to the proton-conductive mixed phase is a mixture of Nafion with poly(4-vinylpyridine). It is considered that the proton-conductive mixed phase hardly conducted protons, since the Tg of the mixture of Nafion with poly(4-vinylpyridine) was theoretically equal to or higher than either of the Tg's of the two substances, that is, 130° C. or more, and the proton-conductive mixed phase was not in a molten state but in a solid state under a non-humidified condition at 80° C.

Example 2

In Example 2, a proton-conductive soft elastomer membrane (weight ratio of Nafion/TEG/S4VP: about 4/4/2) was prepared as in Example 1, except that, in [1] of Example 1, 101 mg of S4VP, 2.00 g of a 10-wt % aqueous dispersion of Nafion (equivalent mass: 1000), and 199 mg of TEG were used. The amount of sulfo groups included in Nafion was theoretically about 3.3 times the amount of pyridyl groups included in S4VP. The alternating current impedance of the membrane was measured as in Example 1, except that, in [2] of Example 1, the thickness of the membrane was changed to be 0.06 cm and the width of the membrane was changed to be 0.33 cm. The membrane had a resistance of $1.2 \times 10^5 \Omega$ and a proton conductivity of $2.3 \times 10^{-4}$ S/cm at 80° C. The membrane had a resistance of $8.3 \times 10^4 \Omega$ and a proton conductivity of $3.3 \times 10^{-4}$ S/cm at 95° C. In Example 2, the proton-conductive mixed phase was a mixture including Nafion, TEG, and poly(4-vinylpyridine) and fixed to polystyrene as in Example 1. The proton-conductive mixed phase had a Tg equal to or lower than room temperature and was therefore in a molten state at the temperature (80° C. or 95° C.) at which alternating current impedance was measured. During the measurement, the proton-conductive soft elastomer membrane prepared in Example 2 did not become fluidized and retained its original shape as a whole.

Example 3

In Example 3, a proton-conductive soft elastomer membrane (weight ratio of Nafion/TEG/S4VP: about 6/3/1) was prepared as in Example 1, except that, in [1] of Example 1, 50 mg of S4VP, 3.03 g of a 10-wt % aqueous dispersion of Nafion (equivalent mass: 1000), and 150 mg of TEG were used. The amount of sulfo groups included in Nafion was theoretically about 9.8 times the amount of pyridyl groups included in S4VP. The alternating current impedance of the membrane was measured as in Example 1, except that, in [2] of Example 1, the thickness of the membrane was changed to be 0.04 cm and the width of the membrane was changed to be 0.21 cm. The membrane had a resistance of $8.3 \times 10^4 \Omega$ and a proton conductivity of $6.9 \times 10^{-4}$ S/cm at 80° C. The membrane had a resistance of $5.6 \times 10^4 \Omega$ and a proton conductivity of $1.0 \times 10^{-3}$ S/cm at 95° C. In Example 3, the proton-conductive mixed phase was a mixture including Nafion, TEG, and poly(4-vinylpyridine) and fixed to polystyrene as in Example 1. The proton-conductive mixed phase had a Tg equal to or lower than room temperature and was therefore in a molten state at the temperature (80° C. or 95° C.) at which alternating current impedance was measured. During the measurement, the proton-conductive soft elastomer membrane prepared in Example 3 did not become fluidized and retained its original shape as a whole.

Example 4

Figure 5:
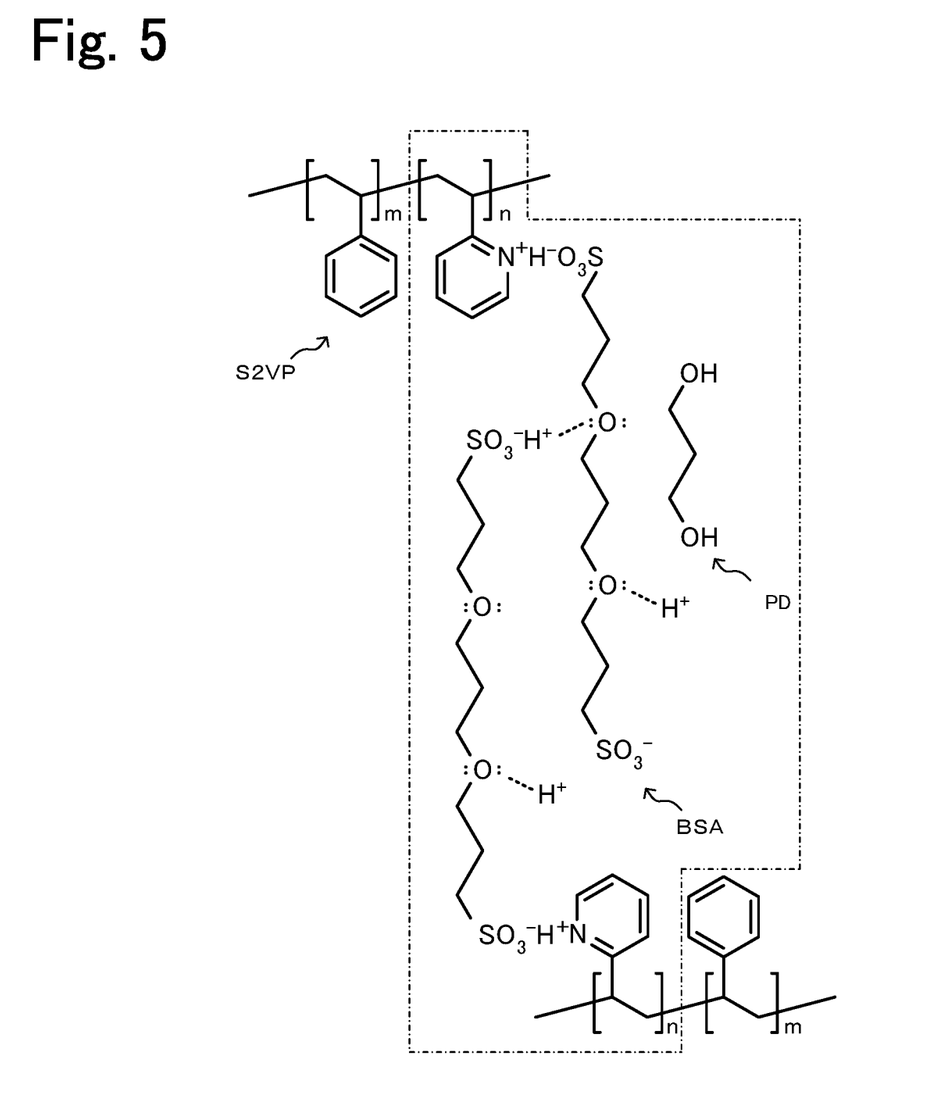
FIG. 5 is a schematic diagram illustrating a proton-conductive soft elastomer membrane prepared in Example 4.

In Example 4, a polystyrene-b-poly(2-vinylpyridine) block copolymer (hereinafter, referred to as "S2VP") synthesized by living anionic polymerization was used instead of S4VP used in [1] of Example 1. The average degree of polymerization of polystyrene was 1250. The average degree of polymerization of poly(2-vinylpyridine) was 1285. Furthermore, 3,3'-(propane-1,3-diylbis(oxy))bis(propane-1-sulfonic acid) (referred to as "BSA")/1,3-propanediol (referred to as "PD") was used instead of Nafion/TEG. BSA was synthesized by a method analogous to the schemes reported in Solid State Ionics, 1995, vol. 80, pp. 201-212 and Colloid Polymer Science, 2014, vol. 292, pp. 1261-1268. A proton-conductive soft elastomer membrane (weight ratio of BSA/PD/S2VP: about 4/4/2) was prepared as in Example 1, except that 97 mg of S2VP and 1.0 g of a THF/MeOH mixed solvent with a weight ratio of 7/3 were used, 191 mg of BSA was used instead of Nafion, 191 mg of PD was used instead of TEG, and 0.9 g of a THF/MeOH mixed solvent with a weight ratio of 7/3 was used instead of 2.0 g of a THF/MeOH mixed solvent with a weight ratio of 6/4. The amount of sulfo groups included in BSA was theoretically about 2.5 times the amount of pyridyl groups included in S2VP. FIG. 5 is a schematic diagram illustrating the proton-conductive soft elastomer membrane. In FIG. 5, the polystyrene portion corresponds to the first site of the polymer; the poly(2-vinylpyridine) portion corresponds to the second site of the polymer; and BSA corresponds to the single proton-conductive substance including the proton-releasing/binding site and the proton coordination site in the same molecule. PD is omissible. The Tg (glass-transition temperature) of polystyrene was about 100° C. The Tg of poly(2-vinylpyridine) was about 100° C. The melting point of BSA was room temperature or less. The melting point of PD was −59° C. The pyridyl groups included in poly(2-vinylpyridine) are ionically bound to the sulfo groups included in BSA. In Example 4, the proton-conductive mixed phase, that is, a mixture including BSA, PD, and poly(2-vinylpyridine), was fixed to polystyrene. It is considered that PD electrostatically interacted with BSA. The proton-conductive mixed phase that includes poly(2-vinylpyridine) (the portion surrounded by the one-dot chain line in FIG. 5) had a Tg equal to or lower than room temperature and was therefore in a molten state at the temperature (47° C. to 95° C.) at which alternating current impedance was measured.

The alternating current impedance of the soft elastomer membrane was measured as in Example 1, except that, in [2] of Example 1, the thickness of the membrane was changed to be 0.03 cm and the width of the membrane was changed to be 0.28 cm. The membrane had a resistance of $4.1 \times 10^4 \Omega$ and a proton conductivity of $1.5 \times 10^{-3}$ S/cm at 80° C. The membrane had a resistance of $2.1 \times 10^4 \Omega$ and a proton conductivity of $2.8 \times 10^{-3}$ S/cm at 95° C. The proton conductivity of the soft elastomer membrane was increased when the temperature was increased from 80° C. to 95° C. This is presumably because, when the temperature was increased, the viscosity of the proton-conductive mixed phase that was in a molten state was reduced and, accordingly, the proton conductivity of the soft elastomer membrane was increased. The membrane had a resistance of $6.1 \times 10^4 \Omega$ and a proton conductivity of $9.8 \times 10^{-4}$ S/cm at 65° C. The membrane had a resistance of $1.4 \times 10^5 \Omega$ and a proton conductivity of $4.3 \times 10^{-4}$ S/cm at 47° C. The proton conductivity of the soft elastomer membrane decreased with a reduction in temperature. This is presumably because, when the temperature was reduced, the viscosity of the proton-conductive mixed phase that was in a molten state was increased and, accordingly, the proton conductivity of the soft elastomer membrane was reduced. During the measurement, the proton-conductive soft elastomer membrane prepared in Example 4 did not become fluidized and retained its original shape as a whole.

Example 5

Polystyrene-b-poly(2-vinylpyridine) (hereinafter, referred to as "S2VP"), which corresponds to the A-B diblock copolymer, was synthesized in accordance with the block copolymer synthesis method (reversible addition-fragmentation chain transfer polymerization) described in Macromolecules 45, 8013-8020 (2012). Measurement of average degree of polymerization and molecular weight distribution (Mw/Mn) was conducted by gel permeation chromatography (GPC) and nuclear magnetic resonance spectroscopy. The average degree of polymerization of polystyrene was 307. The average degree of polymerization of poly(2-vinylpyridine) was 390. The molecule weight distribution Mw/Mn of the copolymer was 1.39.

Subsequently, 50.3 mg of S2VP, 359 mg of a liquid mixture (referred to as "HTFSI/TEG") including bis(trifluoromethanesulfonyl)imide (referred to as "HTFSI") and tetraethylene glycol (referred to as "TEG") which was prepared by mixing HTFSI with TEG at a weight ratio of 58/42, 108 mg of (2-hydroxyethyl) acrylate purified through a basic alumina column, 4.1 mg of N,N'-methylenebisacrylamide, 1.18 g of 1,4-dioxane used as a solvent, and 0.1 mg of azobisisobutyronitrile (referred to as "AIBN") used as a polymerization initiator were weighed and mixed with one another in a sample bottle having a volume of 20 mL. The weight ratio among S2VP, HTFSI/TEG, and the purified (2-hydroxyethyl) acrylate was 1/7/2. The amount of sulfonylimide groups included in HTFSI was theoretically about 2.7 times the amount of pyridyl groups included in S2VP. The resulting mixture was bubbled with nitrogen for 20 minutes and subsequently stirred for 30 minutes at 500 rpm in an oil bath heated at 80° C. to copolymerize (2-hydroxyethyl) acrylate with N,N'-methylenebisacrylamide. After a lapse of 30 minutes, the rotation of the stir bar in the sample bottle stopped and the sample bottle was subsequently immersed in the oil bath heated at 80° C. for another 6 hours and 30 minutes in order to maximize the reaction of unreacted monomers (i.e., (2-hydroxyethyl) acrylate and N,N'-methylenebisacrylamide). Then, the sample bottle was placed on a hot plate heated at 50° C. for about 2 days to perform solvent casting and subsequently vacuum-dried for another 1 day to remove the solvent (i.e., 1,4-dioxane) and unreacted monomers. Hereby, a proton-conductive soft elastomer membrane was prepared.

Hereinafter, the copolymer of (2-hydroxyethyl) acrylate with N,N'-methylenebisacrylamide is referred to as "alcohol group-containing acrylic acid copolymer".

Figure 6:
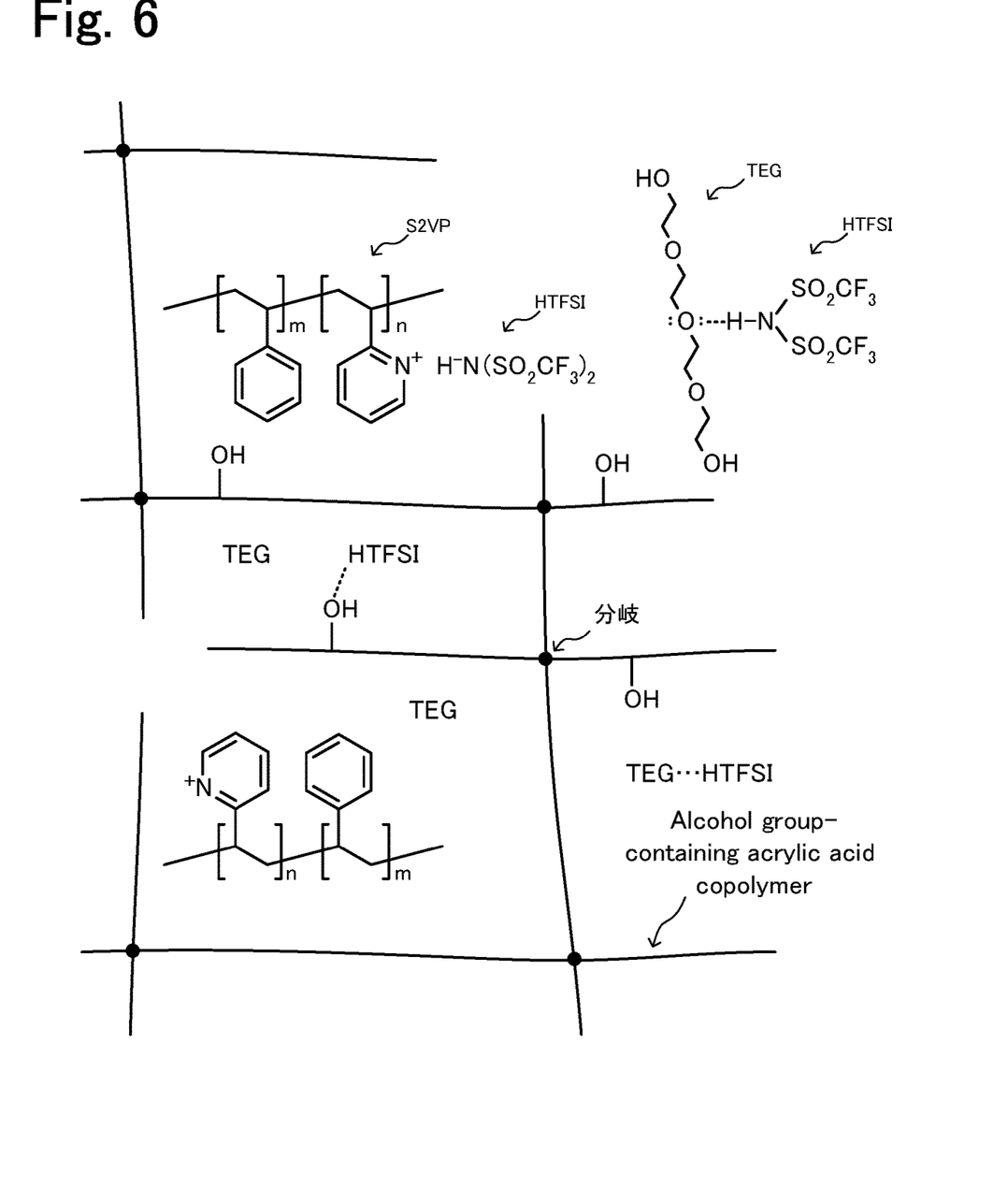
FIG. 6 is a schematic diagram illustrating a proton-conductive soft elastomer membrane prepared in Example 5.

FIG. 6 is a schematic diagram illustrating the proton-conductive soft elastomer membrane. In FIG. 6, the polystyrene portion corresponds to the first site of the polymer; the poly(2-vinylpyridine) portion corresponds to the second site of the polymer; HTFSI corresponds to the substance X including the proton-releasing/binding site; and TEG and the alcohol group-containing acrylic acid copolymer correspond to the substance Y including the proton coordination site. The Tg (glass-transition temperature) of polystyrene was about 100° C. The Tg of poly(2-vinylpyridine) was about 100° C. The Tg of a polymer chain of the alcohol group-containing acrylic acid copolymer which was derived from (2-hydroxyethyl) acrylate was about −15° C. The melting point of TEG was about −6° C. The pyridyl groups included in the poly(2-vinylpyridine) block of S2VP are ionically bound to some of the sulfonylimide groups included in HTFSI. Some of the sulfonylimide groups included in the HTFSI are weakly bound to the oxygen atoms included in the ether linkages of TEG and hydroxyl groups by electrostatic interaction. Some of the sulfonylimide groups release protons to form imidide ions. In Example 5, the proton-conductive mixed phase is a mixture including HTFSI, TEG, the poly(2-vinylpyridine) block of S2VP, and the alcohol group-containing acrylic acid copolymer and is fixed in place by a hard domain constituted by the polystyrene block of S2VP. The alcohol group-containing acrylic acid copolymer includes branching points derived from N,N'-methylenebisacrylamide, which reduce the flowability of the proton-conductive mixed phase and enhance a shape retention property. The proton-conductive mixed phase had a Tg equal to or lower than room temperature and was therefore in a molten state at the temperature (80° C. or 95° C.) at which alternating current impedance was measured.

The alternating current impedance of the soft elastomer membrane was measured as in Example 1, except that, in [2] of Example 1, the distance between the electrodes was changed to be 0.70 cm, the thickness of the membrane was changed to be 0.092 cm and the width of the membrane was changed to be 0.30 cm. The membrane had a resistance of $7.0 \times 10^4 \Omega$ and a proton conductivity of $3.7 \times 10^{-4}$ S/cm at 80° C. After the temperature at which alternating current impedance was measured had been increased to 95° C., the membrane had a resistance of $6.6 \times 10^4 \Omega$ and a proton conductivity of $3.9 \times 10^{-4}$ S/cm. The proton conductivity of the membrane was increased when the temperature was increased. This is presumably because, when the temperature was increased, the molecular mobility of the proton-conductive mixed phase that was in a molten state was increased and, accordingly, the proton conductivity of the membrane was increased. During the measurement, no substance eluted from the proton-conductive membrane was confirmed, and the proton-conductive membrane did not become fluidized and retained its original shape.

The present application claims priority from Japanese Patent Application No. 2016-085786 filed on Apr. 22, 2016, the entire contents of which are incorporated herein by reference.

INDUSTRIAL APPLICABILITY

The present invention can be used in technical fields in which proton-conductive membranes are used, such as the field of fuel cells.

10 fuel cell, 2 MEA, 3 non-humidified proton-conductive membrane, 4 anode, 4a catalyst layer, 4b gas diffusion layer, 5 cathode, 5a catalyst layers, 5b gas diffusion layer, 6 separator, 6g fuel-gas channel, 7 separator, 7g oxidation-gas channel

The invention claimed is:

1. A non-humidified proton-conductive membrane that is a proton-conductive membrane having proton conductivity under a non-humidified condition,
the proton-conductive membrane comprising:
a polymer including a glassy or crystalline first site having a glass-transition temperature or melting temperature higher than a service temperature of the proton-conductive membrane, and a second site including a functional group capable of noncovalently binding to another molecule; and
a proton-conductive substance including a proton-releasing/binding site capable of released protons and a proton coordination site capable of coordinating to the protons, the proton-releasing/binding site including a functional group capable of noncovalently binding to the second site of the polymer, the proton-releasing/binding site and the proton coordination site being included in different molecules that interact with each other or being included in the same molecule,
a proton-conductive mixed phase having a glass-transition temperature lower than the service temperature of the proton-conductive membrane, the proton-conductive mixed phase including the second site to which the proton-releasing/binding site of the proton-conductive substance is bound and the proton-conductive substance,
the amount of the proton-releasing/binding site being larger than the amount of the second site of the polymer.

2. The non-humidified proton-conductive membrane according to claim 1,
wherein the functional group of the second site is a basic group, and the functional group of the proton-releasing/binding site is an acidic group.

3. The non-humidified proton-conductive membrane according to claim 2,
wherein the basic group is a nitrogen-containing heterocycle, and the acidic group includes at least one selected from a carboxyl group, a phosphate group, a sulfo group, and a sulfonylimide group.

4. The non-humidified proton-conductive membrane according to claim 3,
wherein the acidic group includes at least one selected from a sulfo group and a sulfonylimide group.

5. The non-humidified proton-conductive membrane according to claim 1,
wherein the proton coordination site includes at least one selected from an ether linkage, an ester group, an alcohol group, a ketone group, and an amide group.

6. The non-humidified proton-conductive membrane according to claim 1,
wherein the proton coordination site includes at least one selected from an ether linkage and an alcohol group.

7. The non-humidified proton-conductive membrane according to claim 1,
wherein the proton-conductive substance is a mixture of a substance X including the proton-releasing/binding site with a nonaqueous substance Y including the proton coordination site and interacting with the substance X,
wherein the substance X includes at least one selected from a polymer having a side chain including a sulfo group and a fluorine compound including a sulfonylimide group, and
wherein the substance Y includes at least one selected from a protic solvent including an ether linkage and a polymer including an alcohol group.

8. The non-humidified proton-conductive membrane according to claim 1,
wherein the proton-conductive substance is a single pure substance including the proton-releasing/binding site and the proton coordination site in the same molecule and is a disulfonic acid including an ether linkage.

9. A method for producing the non-humidified proton-conductive membrane according to claim 1,
the method comprising:
(a) dissolving or dispersing the polymer and the proton-conductive substance in a solvent to form a mixed solution or dispersion; and
(b) evaporating the solvent included in the mixed solution or dispersion to produce the non-humidified proton-conductive membrane.

10. A fuel cell comprising an anode, a cathode, and the non-humidified proton-conductive membrane according to claim 1, the proton-conductive membrane being interposed between the anode and the cathode.

* * * * *